United States Patent
Thompson et al.

(10) Patent No.: US 11,099,719 B1
(45) Date of Patent: Aug. 24, 2021

(54) MONITORING USER INTERACTIONS WITH A DEVICE TO AUTOMATICALLY SELECT AND CONFIGURE CONTENT DISPLAYED TO A USER

(71) Applicant: International Business Machines Corporation, Armonk, NY (US)

(72) Inventors: Rodney Thompson, Pelham, NH (US); Tanya Simkhovich, North Andover, MA (US); Frederick Scott Eliot, Newbury, MA (US); Douglas George Dempster, Andover, MA (US); Ron Harris, Bedford, NH (US); James John Politis, Windham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/800,071

(22) Filed: Feb. 25, 2020

(51) Int. Cl.
*G06F 3/0482* (2013.01)
*G06F 3/0484* (2013.01)
*G06F 3/0488* (2013.01)
*G06F 11/34* (2006.01)
*G06N 5/04* (2006.01)

(52) U.S. Cl.
CPC ........ *G06F 3/0482* (2013.01); *G06F 3/04845* (2013.01); *G06F 3/04883* (2013.01); *G06F 11/3438* (2013.01); *G06N 5/04* (2013.01)

(58) Field of Classification Search
CPC ............... G06F 3/0482; G06F 3/04845; G06F 3/04883; G06F 11/3438; G06N 5/04
See application file for complete search history.

(56) References Cited

U.S. PATENT DOCUMENTS

| | | | | |
|---|---|---|---|---|
| 6,025,841 | A * | 2/2000 | Finkelstein | G06F 3/0481 715/803 |
| 8,869,027 | B2 | 10/2014 | Louch et al. | |
| 9,886,170 | B2 * | 2/2018 | Wang | G06F 9/451 |
| 9,911,290 | B1 * | 3/2018 | Zalewski | G06Q 20/327 |
| 10,366,434 | B1 * | 7/2019 | Belousova | G06Q 50/12 |

(Continued)

OTHER PUBLICATIONS

Klint Finley, "The Internet of Soda: Why Coca-Cola Has Stockpiled 16 Million Network IDs", published on Jan. 3, 2014 to https://www.wired.com/2014/01/coke-iot, retrieved Sep. 14, 2020 (Year: 2014).*

(Continued)

*Primary Examiner* — Shourjo Dasgupta
(74) *Attorney, Agent, or Firm* — Anthony V. England; SVL IPLaw Edell, Shapiro & Finnan, LLC

(57) ABSTRACT

Techniques are provided for controlling arrangement of content (display elements) on a display presented to a user on a device. A set of display elements is received from a server. A primary tier and one or more secondary tiers are populated with display elements from the set of display elements according to a default pattern to establish an arrangement of the display elements. Interactions of the user with the display elements are monitored, wherein information obtained from monitoring is stored locally on the device. A level of interest of the user for the display elements is inferred based on the interactions. The arrangement of the display elements is updated with regard to the primary tier and the one or more secondary tiers to correspond to the level of interest of the user.

22 Claims, 7 Drawing Sheets

(56) References Cited

U.S. PATENT DOCUMENTS

| | | | |
|---|---|---|---|
| 10,410,257 B1* | 9/2019 | Choi | G06Q 30/0276 |
| 10,452,240 B2 | 10/2019 | Louch et al. | |
| 2003/0050854 A1* | 3/2003 | Showghi | G06Q 20/322 |
| | | | 705/15 |
| 2005/0054381 A1* | 3/2005 | Lee | H04M 1/72586 |
| | | | 455/557 |
| 2006/0248474 A1* | 11/2006 | Kimotsuki | G06F 3/0482 |
| | | | 715/810 |
| 2007/0265935 A1* | 11/2007 | Woycik | G07G 1/14 |
| | | | 705/65 |
| 2009/0049389 A1* | 2/2009 | Kuzmanovic | G06F 9/451 |
| | | | 715/745 |
| 2009/0094555 A1* | 4/2009 | Viitala | H04M 1/72544 |
| | | | 715/838 |
| 2010/0262507 A1* | 10/2010 | Woycik | G06Q 10/00 |
| | | | 705/26.1 |
| 2012/0030622 A1* | 2/2012 | Hasegawa | G06F 3/0482 |
| | | | 715/811 |
| 2012/0240781 A1* | 9/2012 | Delbreil | G06F 3/04817 |
| | | | 99/285 |
| 2014/0057717 A1* | 2/2014 | Yoshikawa | A63F 13/47 |
| | | | 463/31 |
| 2014/0068484 A1* | 3/2014 | Hyun | G06F 3/04817 |
| | | | 715/769 |
| 2014/0361982 A1* | 12/2014 | Shaffer | G06F 9/541 |
| | | | 345/156 |
| 2015/0019352 A1* | 1/2015 | Flynn | G06F 3/04817 |
| | | | 705/14.73 |
| 2016/0253071 A1* | 9/2016 | Mishra | G06F 7/08 |
| | | | 715/811 |
| 2017/0083219 A1* | 3/2017 | Lan | G06F 3/0488 |
| 2018/0027083 A1* | 1/2018 | Fadeev | H04L 67/22 |
| | | | 709/203 |
| 2018/0188931 A1 | 7/2018 | Sirpal et al. | |
| 2018/0210619 A1* | 7/2018 | Mowatt | G06F 3/0481 |
| 2018/0275863 A1* | 9/2018 | Li | G06F 3/04883 |
| 2018/0364888 A1 | 12/2018 | Balzer et al. | |
| 2019/0108709 A1* | 4/2019 | Yamazaki | H04M 1/72533 |
| 2019/0377586 A1* | 12/2019 | Faulkner | G06F 9/451 |
| 2020/0062117 A1* | 2/2020 | Ramiah | B60K 35/00 |

OTHER PUBLICATIONS

Efrat Kasznik, "5 Ways the Internet of Things Transformed the Vending Machine", published on Apr. 10, 2015 to https://www.bizjournals.com/bizjournals/how-to/technology/2015/04/the-internet-of-things-is-transforming-vending.html, retrieved Sep. 14, 2020 (Year: 2015).*

Phillip Tracy, "Bsquare Brings IoT to Coca-Cola's Futuristic Freestyle Machine", published on Dec. 16, 2016 to https://enterpriseiotinsights.com/20161209/channels/use-cases/bbsquare-iot-coke-tag31-tag99square-iot-coke-tag31-tag99, retrieved Sep. 14, 2020 (Year: 2016).*

* cited by examiner

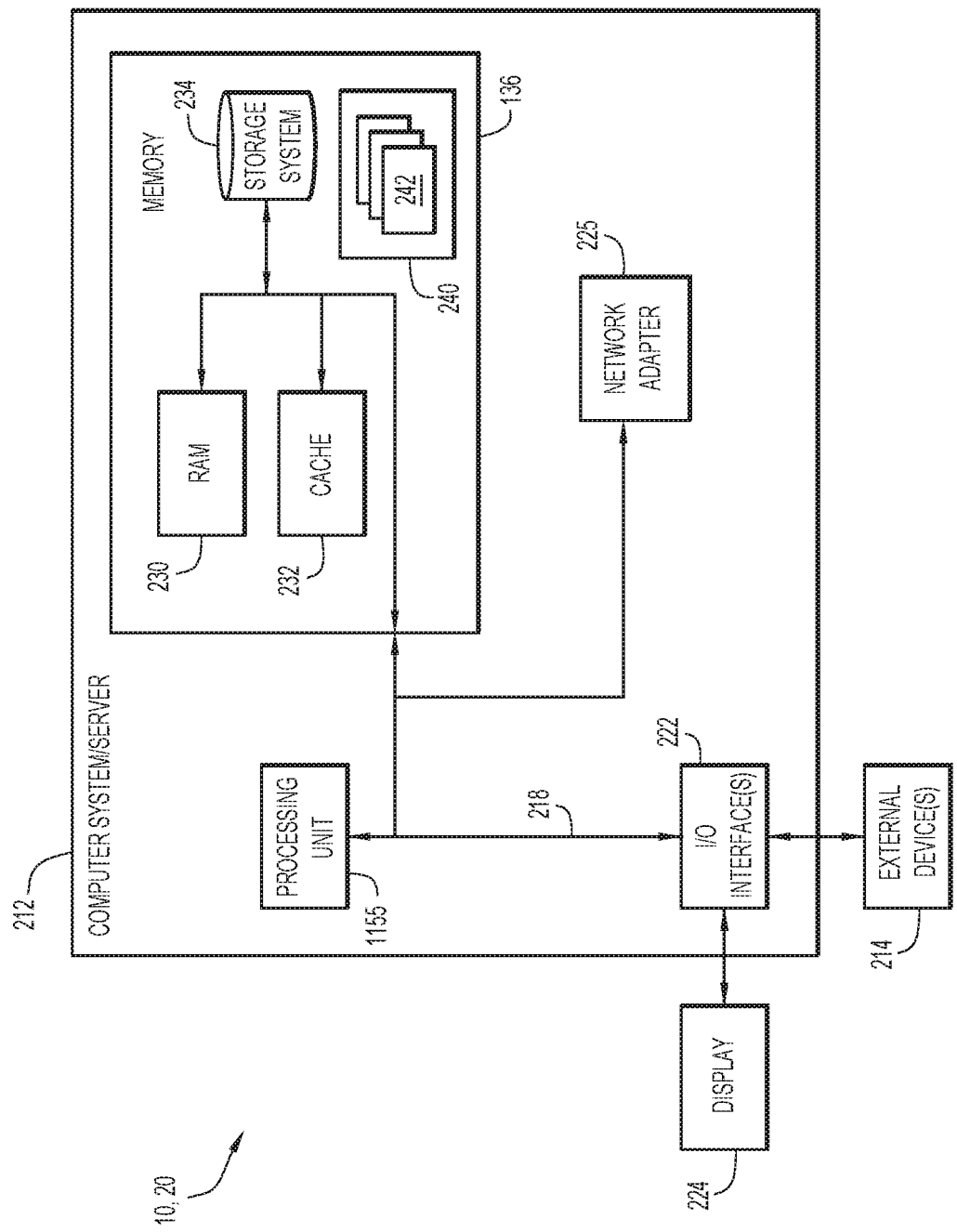

MONITORING USER INTERACTIONS WITH A DEVICE TO AUTOMATICALLY SELECT AND CONFIGURE CONTENT DISPLAYED TO A USER

1. TECHNICAL FIELD

Present invention embodiments relate to monitoring interactions between a user and a device, and automatically selecting and configuring content to display to the user based on the monitored interactions.

2. DISCUSSION OF THE RELATED ART

For many applications, a user typically accesses application settings to define the behavior of an application, including user customizations and preferences.

SUMMARY

According to embodiments of the present invention, methods, systems, and computer readable media are provided for controlling arrangement of content (display elements) on a display presented to a user, for example, on a touch screen device. A set of display elements is received from a server. In aspects, each display element includes an associated structure for display of data. The structure may be in a form of a panel. Display elements determined to be of interest to a user are populated with data requested from a server.

In aspects, a primary tier and one or more secondary tiers are populated with display elements from the set of display elements according to a default pattern to establish an arrangement of the display elements. Interactions of the user with the display elements are monitored, wherein information obtained from monitoring is stored locally on the client device. A level of interest of the user for the display elements is inferred based on the monitored interactions. The arrangement of the display elements is updated with regard to the primary tier and the one or more secondary tiers to correspond to the level of interest of the user.

In aspects, a level of interest for a display element is determined from an amount of time the display element is displayed on a display screen and a frequency of interaction between the user and the display element. This feature allows display elements of interest to be identified, based on interactions of a user with the client device.

In aspects, data that populates the display elements dynamically changes based on user location, time, and/or day. By providing display elements, including a structure for displaying data, the application may receive data updates throughout the day, which are displayed by the display elements, without changing the underlying structure of the display elements. This feature promotes efficiency of the application.

In aspects, the display elements are presented sequentially on a touch screen device by the application. A user may process between different display elements of a tier by swiping horizontally, and may process between different tiers by swiping vertically. These features allow customization of the client device through user interactions via a touch screen device.

In aspects, responsive to receiving a user swipe in a vertical direction, present techniques may determine whether a display element located in the one or more secondary tiers is of interest to the user, and may add the display element to the primary tier when the display element of the one or more secondary tiers is determined to be of interest to the user. This feature allows display elements located in lower tiers to be prioritized for a particular user, based upon user interactions with the application.

In aspects, responsive to a predetermined number of instances of not displaying the display elements in the display for a time above a threshold value, techniques comprise moving the display element from the primary tier to the one or more secondary tiers. This feature identifies display elements that are not of interest to a user based upon user interactions, and minimizes the amount of data requested from a server. For instance, data will not be requested for display elements that are not of interest or are hidden from a user.

In aspects, data corresponding to a related display element is requested from the server, based on the level of interest of a display element. This allows additional relevant content to be customized to a user, based on display elements of interest.

In aspects, data to populate display elements is requested from a server without providing user-specific information in the request. In other aspects, user-specific information is stored locally on the device and is not transmitted to another computing device. These features provide user privacy, allowing a user to obtain content without being linked to a user identifier.

In other aspects, the arrangement of the display elements is automatically updated based on the interactions, and the content of the display elements may be updated as a function of time.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIG. 2 is an example computing device for the computing environment of FIG. 1, according to an embodiment of the present invention.

FIG. 3A shows a flowchart with operations including initialization of the application. FIG. 3B shows a flowchart with operations after initialization of the application.

FIGS. 4A and 4B are illustrations showing an example embodiment for a touch screen device for arranging display elements by monitoring user interactions with the display elements, according to an embodiment of the present invention.

DETAILED DESCRIPTION

Embodiments of the present invention involve a recognition that configuring an application manually is often a tedious process, as the user may need to search through a variety of different screens and menu options in order to identify settings and preferences that the user desires to customize. Moreover, to update preferences and settings due to changing user preferences or software updates, a user may need to repeat a similar process, again navigating through different screens and menu options to manually select settings. This process is both time-consuming and inefficient.

Additionally, when updates to the application occur, the menu for accessing various types of preferences may change or new options may be available, and a user may need to search through newly added or revised portions of the application menu to locate settings and preferences of interest. For new settings that may be available, the user will need to decide if the new settings and preferences are of interest. Accordingly, manually updating personal preferences and settings is a repetitive, time consuming, and complex process.

Further embodiments of the present invention involve a recognition that a user may be tracked by a server to deliver relevant content to a user, thereby foregoing or bypassing customizations. However, when a user initiates a request for data from the client device, a username or user ID is typically provided, allowing the server to track the behavior of the user. This approach does not maintain user privacy.

Present embodiments deliver a personalized application derived from normal user interactions with the client application. Information pertaining to user preferences and characteristics is maintained locally to the client device and is not provided to the server. While the client device may request data to populate display elements from a server, the client device submits such requests without providing identifying information (e.g., a username or user ID) to the server.

Figure 1:
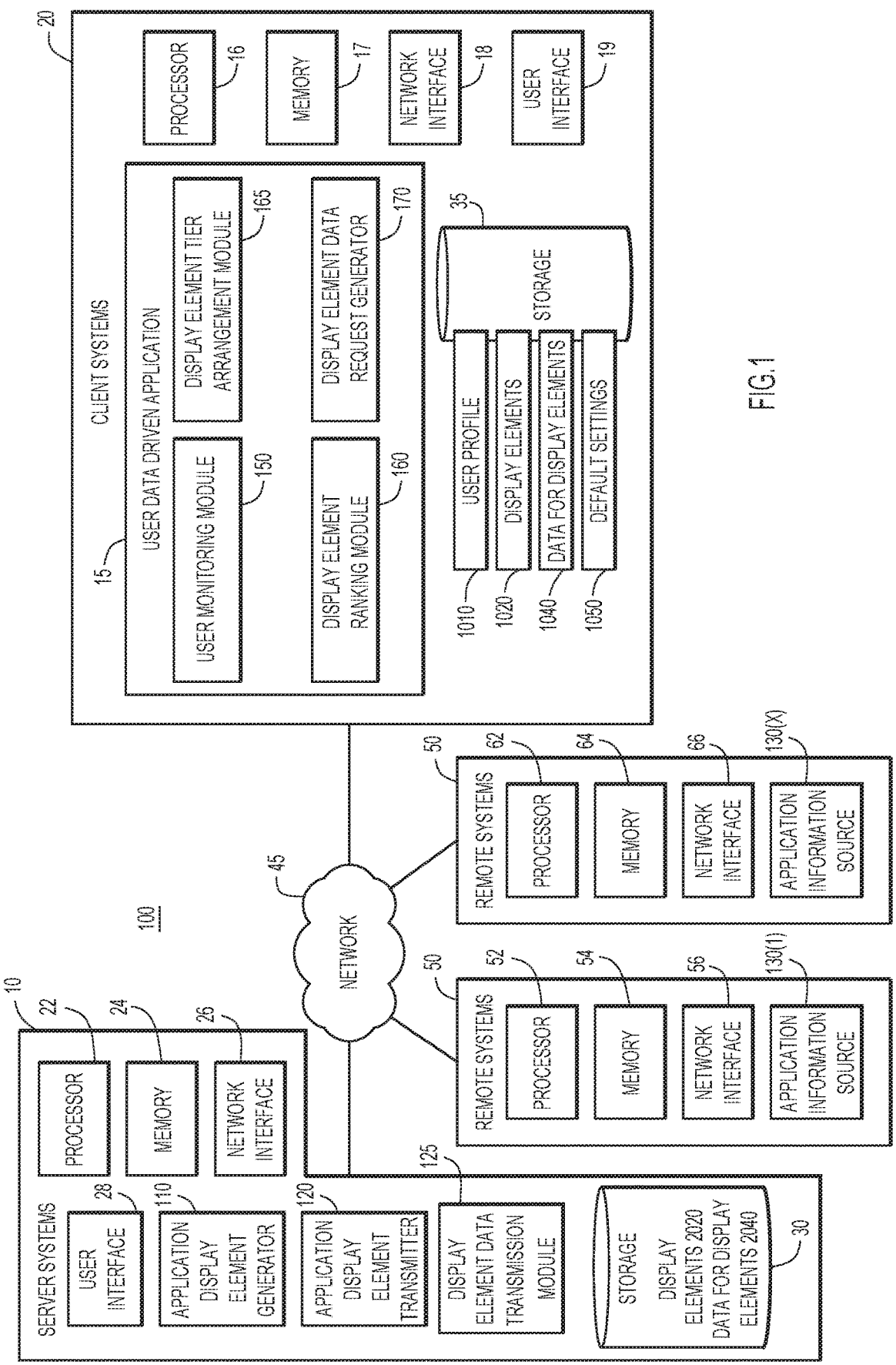
FIG. 1 is a diagrammatic illustration of an example computing environment for arranging display elements by monitoring user interactions with the display elements, according to an embodiment of the present invention.

An example environment for use with present invention embodiments is illustrated in FIG. 1. Specifically, the environment includes one or more server systems 10, one or more client or end-user systems 20, a network 45, and one or more remote systems 50. Server systems 10, client systems 20, and remote systems 50 may be remote from each other and may communicate over a network 45. The network may be implemented by any number of any suitable communications media, such as a wide area network (WAN), a local area network (LAN), Internet, Intranet, etc. Alternatively, server systems 10 and client systems 20, may be local to each other, and may communicate via any appropriate local communication medium, such as local area network (LAN), hardwire, wireless link, Intranet, etc., with both server systems 10 and client systems 20 remote from remote systems 50.

Client systems 20 enable users to receive information from server systems 10, and to send queries/requests to server systems 10. Server systems 10 include an application display element generator 110, an application display element transmitter 120, and a display element data transmission module 125 for communication with client systems 20, as described herein. In aspects, the application display element generator 110/application display element transmitter 120 generates and transmits a set of display elements 2020 to client devices. In aspects, the display elements may include a structure for displaying data, and may not contain data. Data may be provided upon request by display element data transmission module 125 to populate the display elements. Server systems 10 may communicate with remote systems 50 to obtain application source information 130(1)-130(X), which may be stored as data for display elements 2040. Application source information may be static or dynamic information that is provided to server systems 10 for incorporation into a plurality of application display elements. Application display element transmitter 120 may send the display elements to client systems 20 based upon received requests from client systems 20 or in response to dynamic changes in application source information obtained from remote systems 50.

Server systems 10 and client systems 20 may each comprise a storage database, database 30 or database 35, that may store various types of information for the analysis. For example, client systems 20 may store a plurality of display elements 1020 with a structure for displaying data, generated by server systems 10 in storage 35. Storage 35 may also include user profile 1010, which includes information for user preferences regarding display elements of interest and related display elements of interest, as well as ranking information for the display elements. Ranking information may include results of ranking display elements into tiers based upon interactions with a user (e.g., based upon a length of time of display of the display element, based upon a frequency of interaction of the display element, etc.). Data to populate the display elements of interest may be requested from server systems 10 and stored as data for display elements 1040. Default settings 1050 may include initialization settings for display elements used for first launch of the application after installation. Storage 35 may include information stored in a format compatible with display on a touch-screen device as a display element.

Servers systems 10 may store information in storage 30, obtained from remote systems 50, which is processed into data to populate display elements. Storage 30 may include display elements 2020, generated by application display element generator 110 as well as data for display elements 2040, obtained from application source information 130(1)-130(X) of remote systems 50. Display elements 2020 and data for display elements 2040 may be provided to client systems 20. In aspects, data for display elements 1040 may include a subset of data for display elements 2040. Storage 30 may include any suitable information in a structured, semi-structured, or unstructured format.

Database storage 30 and 35 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface 19, such as a GUI, etc., or other interface, such as command line prompts, menu screens, etc., to obtain information pertaining to user interactions with the application.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, user data driven application software, browser/interface software, etc.). By way of example, the server/client includes at least one processor 16, 22 one or more memories 17, 24 and/or internal or external network interfaces or communications devices 18, 26, such as a modem or network cards, and a user interface 19, 28, etc. The optional input devices may include a keyboard, mouse, or other input device. Similarly, remote systems 50 include at least one processor 52, 62, one or more memories 54, 64, and/or internal or external network interfaces or communications devices 56, 66, such as a modem or network cards.

Alternatively, one or more client systems 20 may perform the operations of servers systems 10 in a stand-alone mode of operation. For example, the client system may store or have access to application source information 130(1)-130 (X). The system may generate structures of display elements locally, from information obtained from remote systems 50 and may populate the data structures using application source information. The graphical user or other interface 19, such as a GUI, command line prompts, menu screens, touch screen, etc., may obtain information pertaining to user interactions with the application, which may be used for controlling arrangement of the display elements.

User data driven application 15 may include one or more modules or units to perform the various functions of present invention embodiments described herein. The various modules (e.g., user data driven application 15, comprising a user monitoring module 150, a display element ranking module 160, a display element tier arrangement module 165, a display element data request generator 170, etc.), may be implemented by any combination of any quantity of software and/or hardware modules or units, and may reside within memory 17 of the client for execution by processor 16. These modules are described in additional detail below.

User monitoring module 150 monitors user interactions with client systems 20, as part of the installed user data driven application 15. The user monitoring module may track various user metrics including the amount of time that a display element is displayed on a user screen, how quickly a user swipes horizontally or vertically with regard to a display element, the direction of swiping (horizontally or vertically), as well as whether a user returns to a display element after swiping past the display element. This information may be stored in user profile 1010. User monitoring module 150 may track various user metrics for a predetermined period of time.

Display element ranking module 160 ranks the display elements received by client server 20 based on the user profile 1010 and the user monitoring module 150. Display elements that are determined to be of high interest to a user are displayed in a primary tier, while display elements of lesser interest to a user are displayed in a secondary tier (e.g., a second tier, a third tier, etc.).

Related display elements that are related to topics of interest for a user may be ranked to appear in a second tier, providing the user with an opportunity to interact with related display elements. If a user fails to interact with the related display elements for a predetermined period of time, the ranking may drop and the related display element will be moved into a lower tier. Display element ranking module 160 may also utilize information from server systems 10 (e.g., default arrangement, priority display elements, etc.) when ranking display elements.

In some aspects, display element ranking module 160 may rank the display elements, and this information may be provided to display element tier arrangement module 165 and display element data request generator 170 for placement and population of data.

User profile 1010 comprises content (e.g., display elements, related display elements, etc.) that are of interest to the user and/or may include ranking information with respect to order and placement of the display elements within a tiered hierarchy. This information may be obtained from user monitoring module 150 and/or display element ranking module 160. The user profile 1010 may also be utilized by the display element data request generator 170 to send requests to server systems 10 to obtain data to populate display elements of interest.

Display element tier arrangement module 165 displays display elements based on the results of the display element ranking module 160. The most highly ranked display elements may be displayed in the top tier or primary tier and less highly ranked display elements may appear on one or more secondary tiers (e.g., a second tier, a third tier, etc.). The arrangement of display elements is not fixed and may change based upon user monitoring activities as well as additional and/or updated display elements provided by server systems 10.

In some aspects, especially when there are a large number of display elements, display element tier arrangement module 165 may hide display elements that are determined to be of low interest to a user. These display elements may reappear, at predetermined intervals, to provide the user with an opportunity to interact with the hidden elements.

Display element data request generator 170 may request data to populate the display elements from server systems 10, pertaining to display elements that the user is interested in. In aspects, data may be requested upon launch of the application. In some aspects, data may be requested a single time during launch of the application. In still other aspects, data may be requested at predetermined intervals of time after launch of the application to ensure that data displayed in the application remains up to date. In other aspects, if a user is interested in a display element associated with a particular topic, display element data request generator 170 may also generate a query that is transmitted to server systems 10 to request data to populate related display elements pertaining to additional topics that may be of interest of the user.

On the server side, display element data transmission module 125 may respond to data requests from user data driven application 15 to populate display elements (and related display elements, as available) of interest to the user.

Client systems 20, server systems 10, and remote systems 50 may be implemented by any suitable computing device, such as computing device 212 shown in FIG. 2 for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., user data driven application 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 1155, a system memory 136, and a bus 218 that couples various system components including system memory 136 to processor 1155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., user data driven application 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3A:
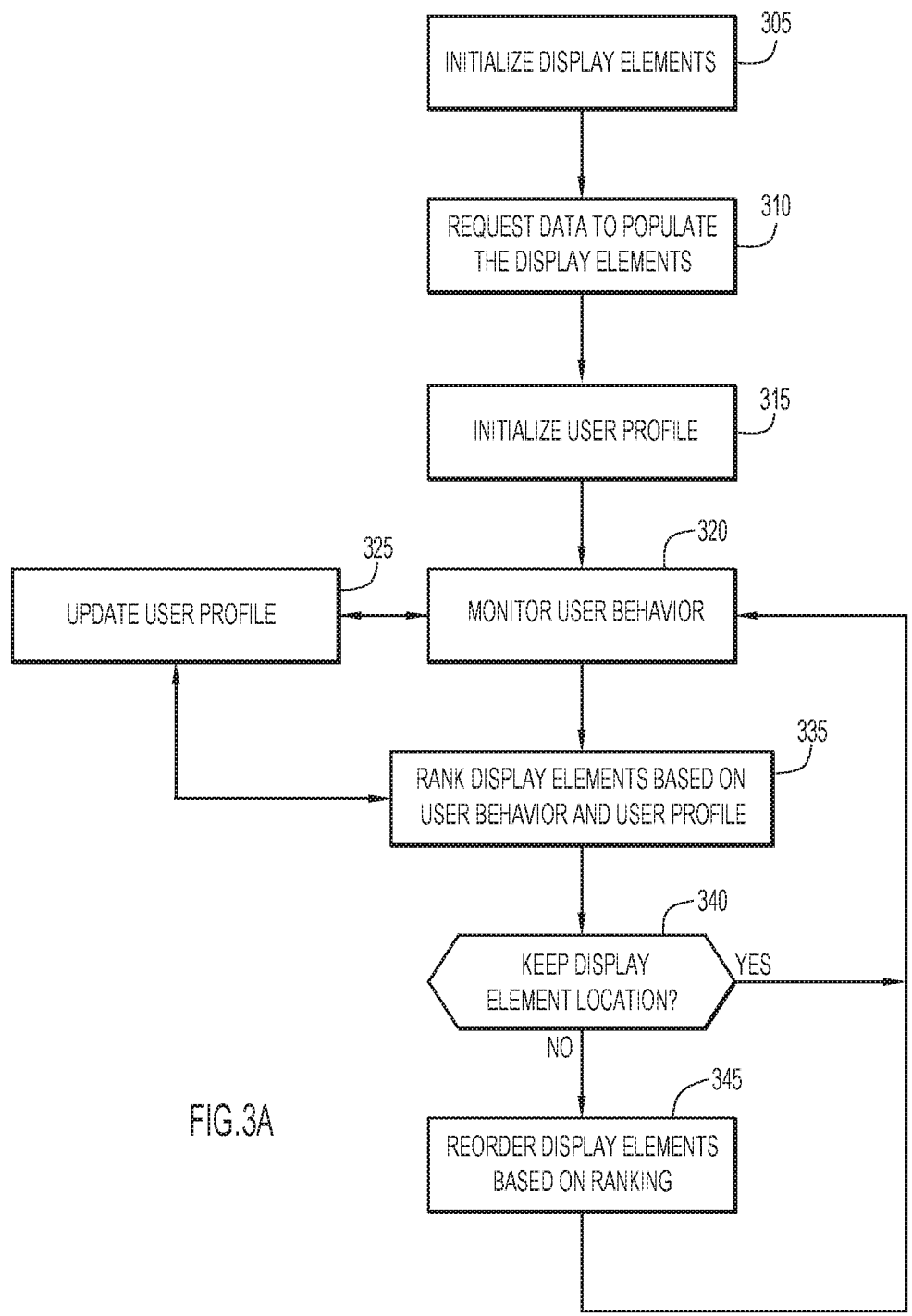
FIGS. 3A and 3B are flowcharts showing operations for arranging display elements by monitoring user interactions with the display elements, according to embodiments of the present invention.

FIG. 3A shows a flow diagram of operations of user data driven application 15 at initialization of the application. At operation 305, the application is installed on a device (e.g., a, touch screen device), and the application enters a "start" mode. The user data driven application receives a plurality of display elements, each display element including a structure for display of data from server systems 10. The display is initialized with a default arrangement of the display elements into a plurality of tiers. Display elements may be supplied to a user based on a variety of factors including, for weather related applications, the location of the user, day of the week, time of day, etc. In general, a first tier may include display elements that are generally of high interest to a population of users, and the second tier may include display elements pertaining to topics that are of lesser interest, as compared to the first tier, for a population of users. This initial layout is set by the default settings of the application, which is not customized by user interactions. In some cases, the display elements may be tagged by server systems 10 with information that the client application utilizes to establish an initial layout. Thus, initially, the order of the display elements are determined by the server which provides the display elements to the client device.

Initially, the user data driven application 15 may request data to populate all display elements received at operation 310. As the user data driven application begins to learn user preferences (as described further with respect to FIG. 3B), only display elements corresponding to topics of interest or related display elements corresponding to related topics of interest are requested from the server by the client device. A display element may contain a structure for displaying information pertaining to a topic. For example, in a weather-related setting, examples of display elements may include panels for current weather conditions, daily forecast, weekend forecast, weekly forecast, Doppler radar, visibility and cloud cover, pollen conditions, air quality index conditions, emergency notifications, etc.

At operation 315, the user profile is initialized with default settings. For example, the default settings do not indicate a user preference for any of the display elements.

At operation 320, the application begins to monitor user behavior to track how a user interacts with each display element presented by the application. Based on this information, the application customizes the display by placing different display elements into different tiers to account for user preferences. By monitoring user interactions with the display elements, the application may additionally determine how to arrange the display elements for a particular user in a given tier.

For example, the system may track the amount of time that a display element is displayed on the user's display screen. Typically, one display element is displayed to a user at a time. To access a subsequent display element, the user may swipe horizontally to access display elements in a primary tier or vertically to access display elements in one or more secondary tiers. Based on the length of time of display, the application determines whether the user has skipped the display element, has skimmed the content of the display element, or has read the content of the display element in detail. User monitoring module 150 monitors the amount of time that a display element is displayed on the user's device to monitor (and stores this information in user profile 1010) a per display element viewing time. In aspects, the user monitoring module 150 may determine a per display element viewing time for a predefined period of time.

The system also monitors whether a user returns to a particular display element, or a per display element frequency of interaction. For example, if a user initially passes a display element but later returns to the same display element, the system will consider repeated views of the display element to be an indicator of user interest. For example, a user may return to the display element multiple times over a predetermined time frame, generating a high frequency of interaction. In this case, the system may infer that this display element contains content that the user is interested in, and may provide this information to user profile 1010. In aspects, the user monitoring module 150 may determine a per display element frequency of interaction for a predefined time frame.

In other cases, a user may pass a display element and may not return to view the display element or may repeatedly pass over the display element. In this case, the system may infer that this display element does not contain content that the user is interested in. In response, the display element may be moved down the display element hierarchy, to a second, third, or fourth tier, etc. In some aspects, display elements that are repeatedly ignored by a user are moved further down the hierarchy (e.g., third tier or more) or may be hidden from the user's view, and other display elements are provided on the second tier so that the user will receive additional options for viewing display elements.

As discussed previously, the application monitors the direction that the user swipes, e.g., horizontally, including left and right, as well as vertically, including up or down. If a user swipes down to access a display element in a lower tier, the system may infer that this display element is of interest to the user. Based on this interaction, the system may determine whether a display element on a lower tier should be placed in a higher tier or on the first tier. Similarly, for a display element placed on the first tier, the system may determine whether this display element should be placed on a lower tier.

Accordingly, user monitoring module 150 obtains information regarding user interactions with each element (e.g., tier location of the display element, frequency of interaction with the display element, and time of display for the display element). User metrics and topics of interest from the display elements are stored locally in user profile 1010 and may be used by display element ranking module 160 to assign a rank to the display elements.

Accordingly, the user monitoring module 150 determines user metrics based on user interaction with the display elements and updates the user profile 1010, at operation 325, based on this information. Thus, the user profile 1010 is updated based on monitoring of user behavior, such that subsequent access to the application retains user preferences. The user profile 1010 may be updated on an ongoing basis.

In aspects, display elements which have no or little interaction with a user may receive a neutral initial ranking, e.g., such that the display elements will be positioned such that the user will encounter the display element (e.g., in a second tier) in order for user interest to be assessed.

Based on the information collected by user monitoring module 150 and the user profile 1010, the display element ranking module 160 may rank each display element based upon user interaction (e.g., length of time of display, frequency of interaction, location access, etc.) at operation 335. Once the display elements are ranked, the ranking may be provided to user profile 1010.

Accordingly, ranking of display elements may be based upon previous rankings (if available), topics of interest, user metrics, and in some cases, information provided by server systems 10. For example, related topics of interest may be placed in a second tier for consideration by the user.

Rankings may place each display element into a tier. In some aspects, a threshold value corresponding to a level of user interaction may be set. The display element ranking module 160 may place display elements into the first tier, when those display elements have a level of user interaction that exceeds the threshold value. The first tier may have a maximum number of display elements, after which remaining display elements are placed in a second tier. For instance, frequency of interaction may be determined based on number of views and/or length of time of each view. This information may be used to generate a total value, which is compared to a threshold value. In other aspects, the frequency of interaction and length of time of display (e.g., based on scrolling patterns, horizontally or vertically, etc.) may be considered independently, such that either one exceeding a respective threshold value places the corresponding display element into the first tier. The ranking information may be stored in user profile 1010.

The ranking results are provided to display element tier arrangement module 165, which determines the tier and order of display elements within the tier, as presented to a user. In aspects, the number of display elements in a tier is not restricted, and the total number of tiers is not restricted. For example, the primary tier may contain two to 20 display elements or more, although typically, the number of display elements per tier ranges from three to ten display elements. Similarly, the number of tiers may range between two and 20 levels of tiers. However, a typical embodiment will contain between two and six levels of tiers. Tier placement is determined by the display element ranking module 160. Additionally, each tier may be sorted in order of descending numeric values corresponding to frequency of interaction and length of time of display. As indicated previously, new display elements from the server system may automatically be placed into a respective tier, based on urgency (e.g., from an urgent weather event) and/or similarity to topics of interest (related display elements). If no changes in display element tier and order occur, at operation 340, the system proceeds to operation 320. Otherwise, the display elements are reordered based on the rankings at operation 345, and the system proceeds to operation 320.

Figure 3B:
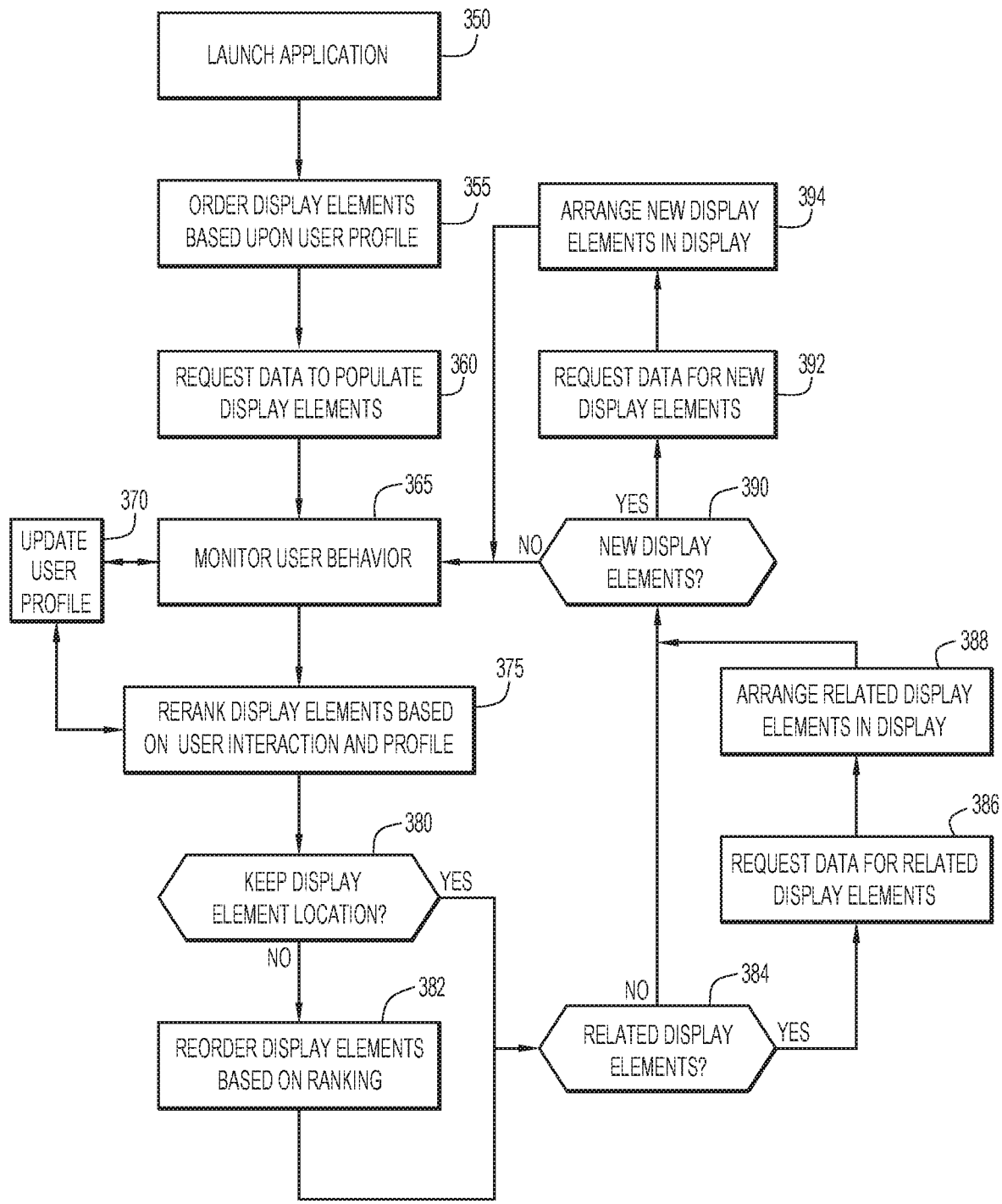

FIG. 3B is a flowchart of operations of the device after initialization. In this aspect, the device has been initialized, and when the application is subsequently launched, a user profile is used to arrange the display elements. Thus, once initialized and evaluated for user interest, display elements are placed in a tier, and the client device requests data to populate the display elements, e.g., for an hourly forecast, as needed throughout the day.

At operation 350, the application is launched. At operation 355, the user profile is utilized to arrange the display elements into tiers based upon user preferences. Display elements in which the user is not interested in may be hidden or placed in a lower tier. At operation 360, a request for data to populate the display elements of interest is sent to server 10. The requested data may be stored in a temporary buffer or queue, for placement into a display element positioned within a tier by the application. In some aspects, data is not requested for hidden display elements.

At operation 365, user behavior continues to be monitored, as the user interacts with the display elements. At operation 370, the user profile 1010 may be updated based on ongoing monitoring of user behavior. At operation 375, the ranking of display elements may be updated to reflect ongoing monitoring. The updated ranking may be stored in user profile 1010.

Thus, as the user data driven application 15 learns user preferences, based on monitoring of user interactions with the display elements, the user profile 1010 may be updated with this information. In aspects, the user profile module aggregates various type of information, including display elements of interest, related display elements of interest, user metrics (e.g., frequency of interaction, time of interaction with a display element), and optionally, information provided by server systems 10. This information may be used to determine the tier and order within the tier of the display elements.

At operation 380, the application determines whether the display element location in the tiered hierarchy is to be maintained. If no changes are needed, the application proceeds to operation 384. If changes are needed, at operation 382, the display elements are reordered based on the updated ranking.

At operation 384, the application determines whether related display elements have been provided by the server. If related display elements have not been provided, the system continues at operation 390. Otherwise, the system continues to operation 386. At operation 386, data to populate related display elements is requested. Related display elements are display elements that are similar in content to display elements that are of interest to a user. At operation 388, the related display elements are arranged in the display. For example, these elements may be placed adjacent to the corresponding display element of interest, or may be placed immediately below the display element of interest in the tiered hierarchy.

At operation 390, the system determines whether new display elements have been provided from an update provided by the server systems 10. If updates have not been provided, the system continues at operation 365. Otherwise, the system continues to operation 392.

At operation 392, the client device may receive new display elements from the server system. In aspects, the new display elements may originate from new types of information provided by the server systems. For example, the application may provide new features (new display elements) to users as the application is further developed.

In some cases, new display elements may be provided to all users of the application. For example, a change in events, e.g., a new weather event or alert, a new outbreak, a new lifestyle feature, etc., may be developed. In some cases, the display elements may be dynamically generated throughout the day by server systems, and may be provided to a client system on an ongoing basis.

If new display elements are provided, the system requests data for the new display elements at operation 392. At operation 394, the new elements are arranged in the tiered display. New display elements may be placed in the second tier to obtain user interaction.

In certain aspects, new display elements may include urgent information targeted to a user (e.g., for weather-related applications, an evolving storm, or other weather event). In some aspects, the system may place these new display elements (and optionally may auto-populate these display elements with data) in the first tier, to ensure that the user will see these urgent display elements. Accordingly, the system may override user preferences under certain situations. Additionally, the application may send a notification to the user indicating that a new display element has been added to alert a user to a pending weather event. After the new display elements are placed in a tier, the application returns to operation 365, to continue monitoring the user and progress through the operations as described herein.

In general, display elements generated by a server are not deleted or added by a user, rather, there is a fixed set of display elements provided to a client device from a server. The display elements are arranged based on monitoring of the user. Thus, while the order and tiered locations of display elements may change over time, the server determines the number and content of the display elements. On the client side, a client device may hide display elements based on user preferences, for example, presenting a subset of available display elements to a user. These elements may be hidden or temporarily discarded from the client device. The user data driven system may periodically request all available display elements from the server, at predetermined intervals, providing the user with additional opportunities to interact with a display element.

In some cases, display elements may be optionally vertically ordered according to subject matter such that a display element on the upper tier may be related in terms of subject matter to a display element immediately below it in a lower tier. This would allow organization of topics to be presented to the user in a predictable fashion. However, in other aspects the ordering of the display elements may be random.

Figure 4A:
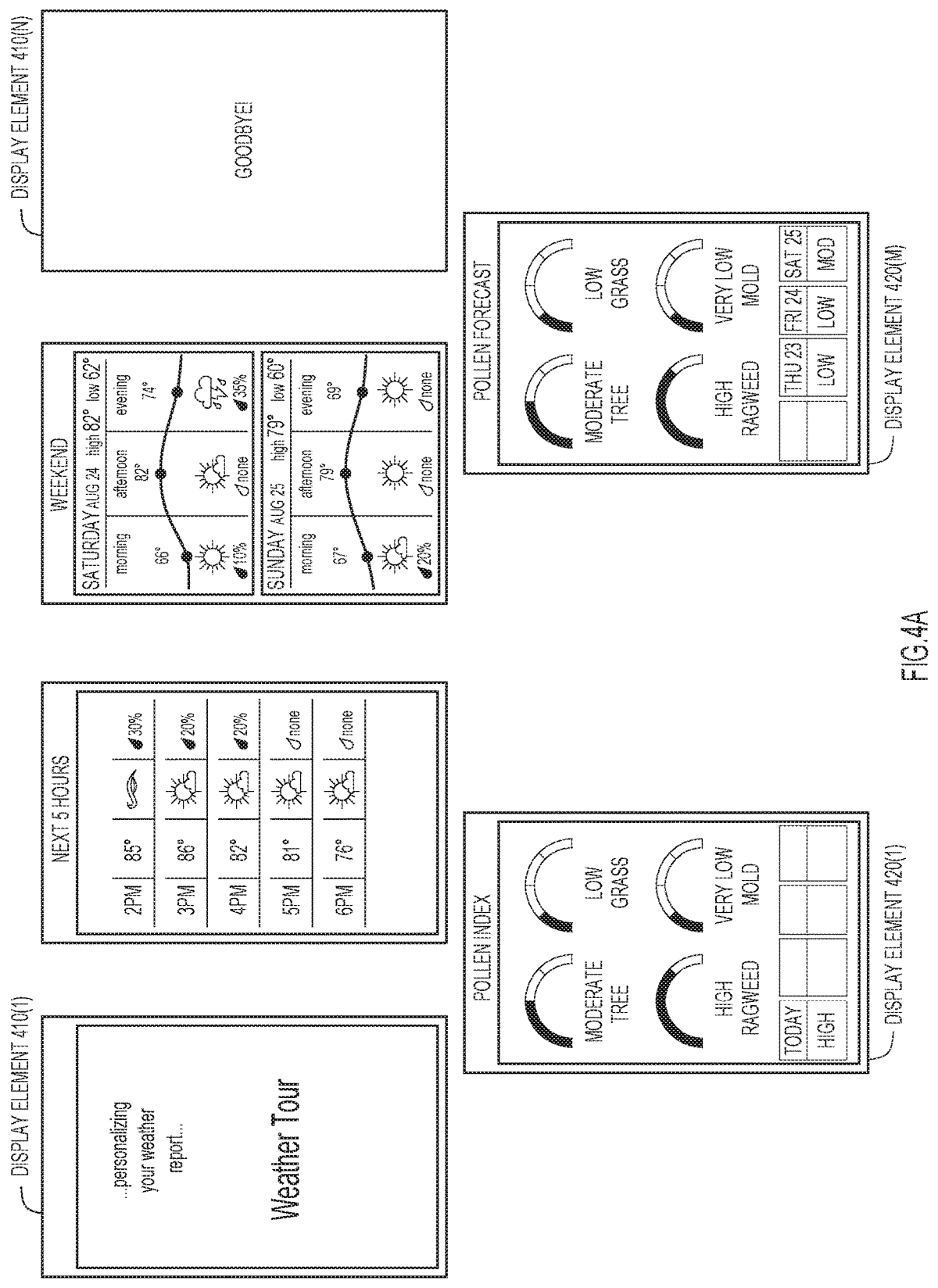
Figure 4B:
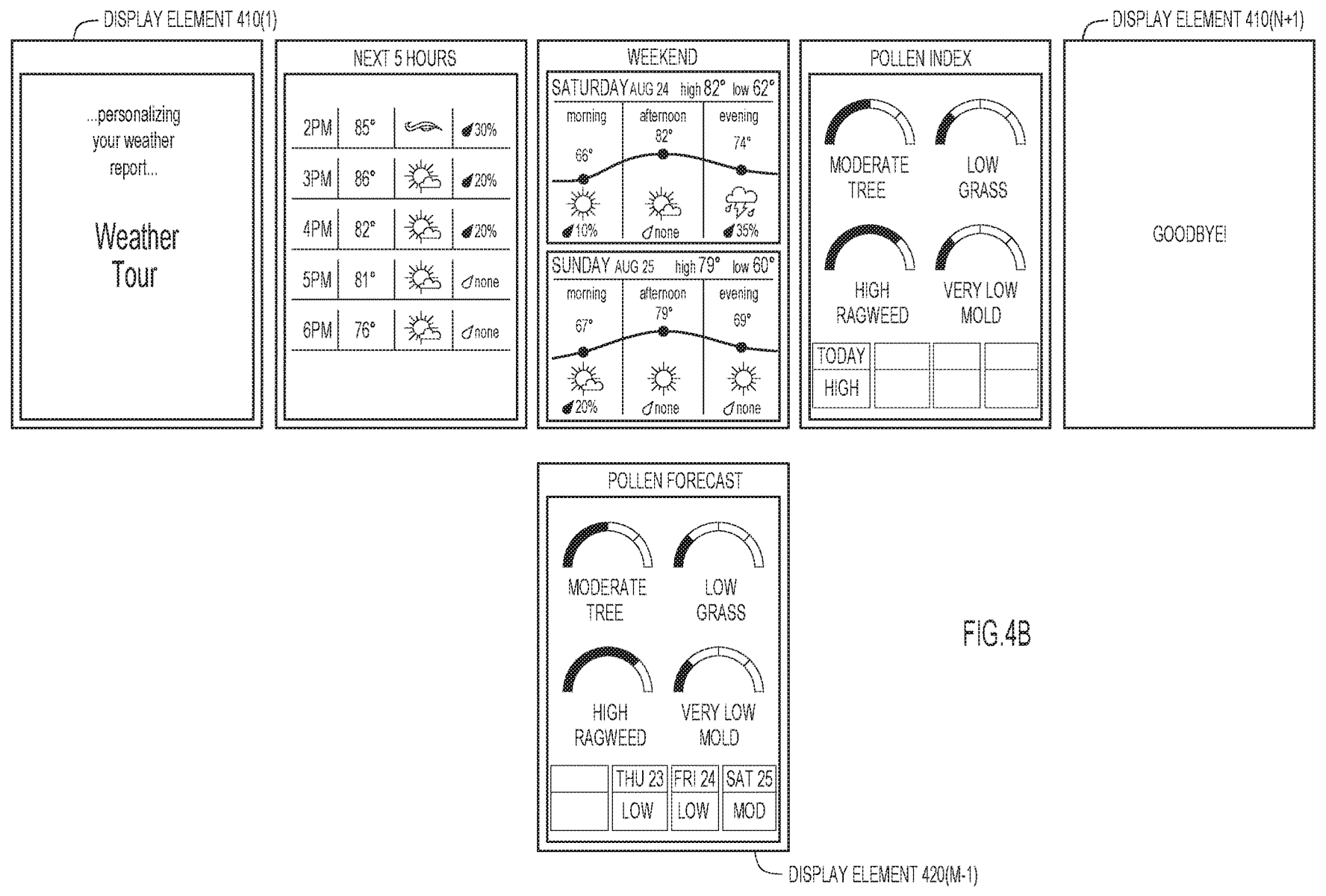

FIGS. 4A and 4B show an initial arrangement of display elements followed by rearrangement of display elements based on user interactions. In this example, the weather application may provide weather information, weather related information, and alerts.

For example, a user may receive a variety of display elements pertaining to a specific day, location, and time regarding current and/or predicted weather. For example, display elements may include a display element for each of Doppler radar, predicted hourly weather, predicted daily weather, predicted weekly weather, emergent weather events, severe weather alerts, regional weather maps, local weather maps as well as various lifestyle related weather information or any other weather related information.

Lifestyle related information may include display elements for each of an allergy or pollen tracker, a cold and flu or other outbreak tracker, water scarcity maps, destination forecasts, or other health and activity trackers. The lifestyle display elements may include topics that are impacted by the weather but are not the weather itself. In general, lifestyle display elements may be placed on a second tier, e.g., at initialization, and usually not in the primary tier.

In FIG. 4A, display elements 410(1) through 410(N) are displayed on the top tier. A second tier is shown, with two lifestyle display elements, display element 420(1) and display element 420(M). A user may swipe vertically to access display element 420(1) or 420(M). In this example, the user displays the display element 420(1) for a period of time sufficient to cause the user monitoring module 150 and display element ranking module 160 to determine that this display element is of interest to the user. Accordingly, ranking information may be provided to display element tier arrangement module 165 to configure the display to include this display element in the primary tier. As shown in FIG. 4B, the display element of interest 420(1) is positioned in the upper tier. In aspects, the application may evaluate the display elements in the upper tier to determine whether any of these elements are not of interest to the user, and therefore, one or more of these display elements may be moved to one or more secondary tiers.

While not shown in FIGS. 4A and 4B, if a storm or other weather related event develops (e.g., a severe weather alert), a display element pertaining to that event is generated by server systems 10 and sent to the user data driven application. In this case, server systems 10 may set the priority of the display element to be included in the primary tier, allowing users to receive urgent alerts. In some cases, a display element may be coupled with a sound or other feature to alert a user to the presence of the received display element.

For weather-related systems, techniques for determining weather information display elements presented to a user on a mobile device may comprise: receiving by a weather information application of the mobile device, a set of weather information display elements. The weather information display elements are arranged based on default settings, for example, a primary tier comprising main display elements and a secondary tier comprising optional display elements. The weather information display elements are presented sequentially on the mobile device by the application, wherein the user swipes in one direction from one of the main display elements to a next one of the main display elements of the set. Respective navigators (e.g., arrows) for respective ones of the main display elements may be provided, each navigator being for navigating by a swipe in an orthogonal direction to a respective one of the main display elements. Responsive to receiving a user swipe in an orthogonal direction to display a particular one of the optional display elements, the application adds the particular optional display element to the primary tier of weather information for the user. Responsive to a predetermined number of instances of not receiving a user swipe to display the particular optional display element, the application removes the particular optional display element from the primary tier of weather information for the user, and may add a different optional display element to the primary tier.

Present embodiments are not limited to weather applications, and are suitable for any environment, and in particular, environments in which information may dynamically and/or rapidly change (e.g., weather, news feeds, social media, online retail environments, online search environments, etc.). For example, a similar approach may be used for online shopping applications, in which a search history is stored local to the device and the application requests additional information (e.g., similar items, items other users have purchased, etc.) from a server. In each case, the application may monitor user activities and may maintain user-related information local to the device on which the application is running. Requests may be sent to a server for data to populate display elements of interest for a user. However, the server only receives a request for additional information, without other information pertaining to the user (e.g., user ID or user name), and therefore, aspects of user privacy are maintained.

Figure 5:
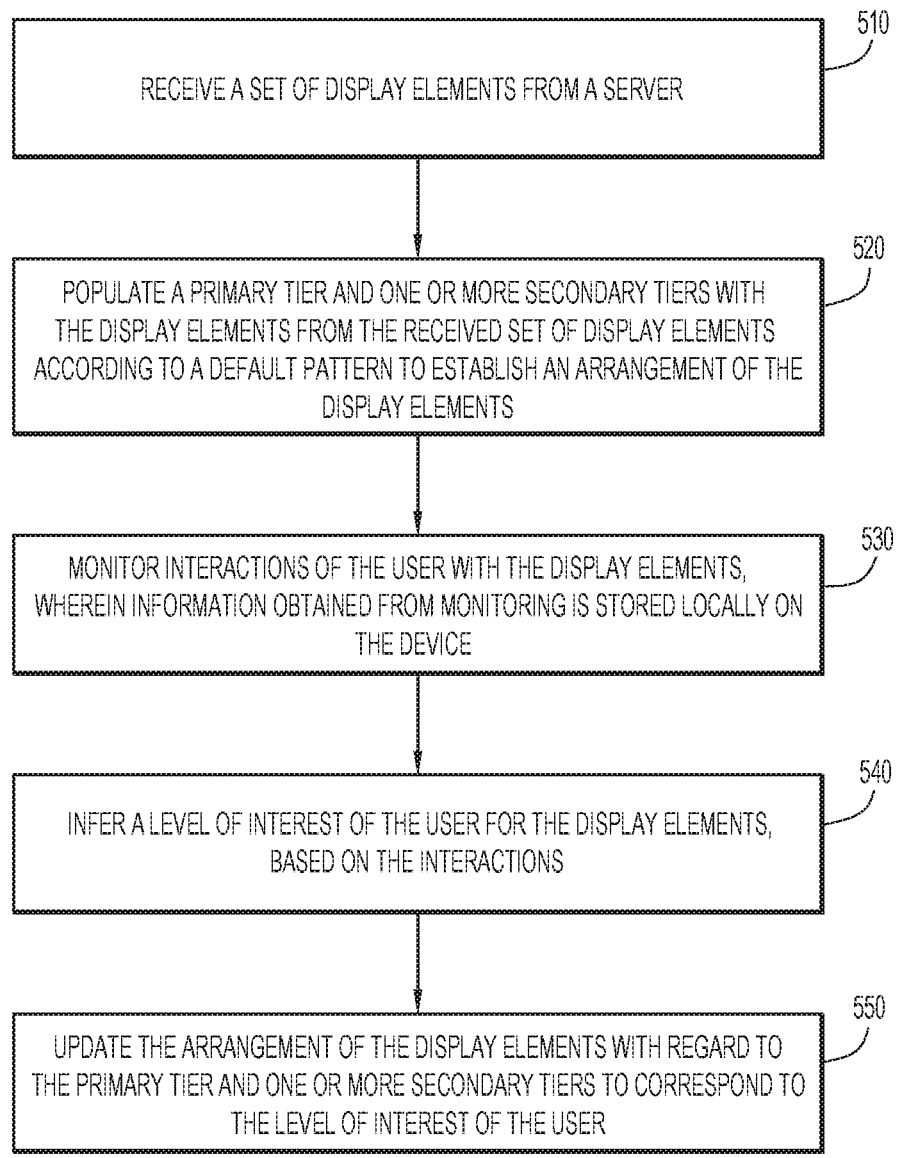
FIG. 5 shows a high level flowchart of operations for arranging display elements by monitoring user interactions with the display elements, according to an embodiment of the present invention.

FIG. 5 is an operational flow chart showing high level operations of the techniques provided herein. At operation 510, a set of display elements is received from a server. In aspects, the display elements are associated with a structure for displaying data. At operation 520, a primary tier and one or more secondary tiers are populated with the display elements from the set of received display elements according to a default pattern to establish an arrangement of the display elements.

At operation 530, interactions of the user with the display elements are monitored, wherein information obtained from monitoring is stored locally on the device (e.g., a touch screen device), for example, in a user profile.

At operation 540, a level of interest of the user for the display elements is inferred based on the interactions. At operation 550, the arrangement of the display elements is updated with regard to the primary tier and the one or more secondary tiers to correspond to the level of interest of the user. In aspects, once the device is customized to a user's preferences, data will only be requested for display elements that are of interest to a user. Data will not be requested for display elements that are not of interest to a user, or for display elements that have been hidden.

Aspects of the present techniques are not intended to be limited to touch screen devices, but may be applied to any device in which user interaction with a display screen may be monitored, e.g., mouse, command line, buttons, etc.

Benefits of the present techniques include maintaining user privacy. As only the application local to the client device is tracking and monitoring user activities, this information stays local to the client device. In this example, the server does not monitor the user or generate a user profile containing characteristics of the user. The server simply responds to requests from client system 20 to send requested information. In other words, user specific information is not sent to a central server, but rather, is generated and maintained locally to the client device.

Present techniques provide an improvement to the field of data processing and in regards to the display of content on a computer device. User interactions are monitored and are used to automatically adjust the displayed content for a specific user. The content provided on display elements may change over time and display elements may be reordered based on user interactions. Accordingly, if a user loses interest in a type of content and no longer reads the content of a given display element, the system will adapt the display to reflect this change of user interest. This approach allows the display to be updated without manually adjusting settings in a customization menu. Thus, present techniques adaptively tailor dynamic content provided on a display (through display elements) to a user in an automated manner.

These techniques may be applied to a wide variety of environments, including weather, online sales, finance, social media, news feeds, or any other environment in which data may change on an ongoing basis.

It will be appreciated that the embodiments described above and illustrated in the drawings represent only a few of the many ways of implementing embodiments for user data driven applications.

The environment of the present invention embodiments may include any number of computer or other processing systems (e.g., client or end-user systems, server systems, etc.) and databases or other repositories arranged in any desired fashion, wherein the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, user data driven application system, etc.). These systems may include any type of monitors and input devices (e.g., keyboard, mouse, voice recognition, etc.) to enter and/or view information.

It is to be understood that the software (e.g., user data driven application 15, including a user monitoring module 150, a display element ranking module 160, a display element tier arrangement module 165, a display element data request generator 170, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., user data driven application 15, including a user monitoring module 150, a display element ranking module 160, a display element tier arrangement module 165, a display element data request generator 170, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user profiles 1010, display elements 1020, data for display elements 1040, default or initialization settings 1050, etc.). The database system may be implemented by any number of any conventional or other databases, data stores or storage structures (e.g., files, databases, data structures, data or other repositories, etc.) to store information (e.g., user profiles 1010, display elements 1020, data for display elements 1040, default or initialization settings 1050, etc.). The database system may be included within or coupled to the server and/or client systems. The database systems and/or storage structures may be remote from or local to the computer or other processing systems, and may store any desired data (e.g., user profiles 1010, display elements 1020, data for display elements 1040, default or initialization settings 1050, etc.).

The present invention embodiments may employ any number of any type of user interface (e.g., Graphical User Interface (GUI), command-line, prompt, etc.) for obtaining or providing information (e.g., user profiles 1010, display elements 1020, data for display elements 1040, default or initialization settings 1050, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output of the user data driven application 15 may include any information arranged in any fashion, and may be configurable based on rules or other criteria to provide desired information to a user (e.g., display elements and arrangement thereof, data to populate display elements, etc.).

The present invention embodiments are not limited to the specific tasks or algorithms described above, but may be utilized for any application in which user privacy is desired. Further, this approach may be generally applicable to providing information in any context, and is not limited to any particular application domain, such as weather, online retail, finance, social media, or news feeds, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling arrangement of elements on a display presented to a user on a device comprising:
    receiving at the device a set of display elements from a server;
    populating a primary tier and one or more secondary tiers with the display elements from the received set of display elements according to a default pattern to establish an arrangement of the display elements among the primary tier and the one or more secondary tiers;
    monitoring interactions of the user with the display elements on the device, wherein information obtained from monitoring is stored locally on the device;
    inferring a level of interest of the user for the display elements based on the interactions; and
    updating the arrangement of the display elements among the primary tier and the one or more secondary tiers based on the level of interest of the user, wherein updating comprises moving a display element from the primary tier to the one or more secondary tiers in response to not displaying the display element for a time above a threshold value.

2. The method of claim 1, wherein the level of interest for a corresponding display element is determined from an amount of time the corresponding display element is displayed on the display and a frequency of interaction between the user and the corresponding display element.

3. The method of claim 1, wherein data that populates the display elements dynamically changes based on user location, time, and/or day.

4. The method of claim 1, wherein the display elements are presented sequentially on a touch screen device, and further comprising:
    process between different display elements of a tier in response to a horizontal swipe from the user; and
    process between different tiers in response to a vertical swipe from the user.

5. The method of claim 1, wherein responsive to receiving a user swipe in a vertical direction, the method further comprising:
    determining whether a corresponding display element located in the one or more secondary tiers is of interest to the user; and
    adding the corresponding display element to the primary tier when the corresponding display element of the one or more secondary tiers is determined to be of interest to the user.

6. The method of claim 1, further comprising:
    requesting data corresponding to related display elements, based on display elements of interest.

7. The method of claim 1, further comprising:
    sending a request for data to populate the display elements without providing user-specific information in the request.

8. The method of claim 1, wherein user-specific information is stored locally on the device and is not transmitted to another computing device.

9. A computer system for controlling arrangement of elements presented on a display to a user, the computer system comprising:
    one or more computer processors;
    one or more computer readable storage media;
    program instructions stored on the one or more computer readable storage media for execution by at least one of the one or more computer processors, the program instructions comprising instructions to:
        receive a set of display elements from a server;
        populate a primary tier and one or more secondary tiers with the display elements from the received set of display elements according to a default pattern to establish an arrangement of the display elements among the primary tier and the one or more secondary tiers;
        monitor interactions of the user with the display elements, wherein information obtained from monitoring is stored locally;
        infer a level of interest of the user for the display elements based on the interactions; and
        update the arrangement of the display elements among the primary tier and the one or more secondary tiers based on the level of interest of the user, wherein updating comprises moving a display element from the primary tier to the one or more secondary tiers in response to not displaying the display element for a time above a threshold value.

10. The computer system of claim 9, wherein the level of interest for a corresponding display element is determined from an amount of time the corresponding display element is displayed on the display and a frequency of interaction between the user and the corresponding display element.

11. The computer system of claim 9, wherein the display elements are presented sequentially on a touch screen device, and wherein the program instructions further comprise instructions to:
    process between different display elements of a tier in response to a horizontal swipe from the user; and
    process between different tiers in response to a vertical swipe from the user.

12. The computer system of claim 9, wherein responsive to receiving a user swipe in a vertical direction, the program instructions further comprise instructions to:
    determine whether a corresponding display element located in the one or more secondary tiers is of interest to the user; and
    add the corresponding display element to the primary tier when the corresponding display element of the one or more secondary tiers is determined to be of interest to the user.

13. The computer system of claim 9, wherein the program instructions further comprise instructions to:
    request data corresponding to related display elements, based on display elements of interest.

14. The computer system of claim 9, wherein the program instructions further comprise instructions to:
    send a request for data to populate the display elements without providing user-specific information in the request.

15. The computer system of claim 9, wherein user-specific information is stored locally to the computer system and is not transmitted to another computing device.

16. A computer program product for controlling arrangement of elements presented on a display to a user, the computer program product comprising one or more computer readable storage media collectively having program instructions embodied therewith, the program instructions executable by a computer to cause the computer to:
- receive a set of display elements from a server;
- populate a primary tier and one or more secondary tiers with the display elements from the received set of display elements according to a default pattern to establish an arrangement of the display elements among the primary tier and the one or more secondary tiers;
- monitor interactions of the user with the display elements, wherein information obtained from monitoring is stored locally;
- infer a level of interest of the user for the display elements based on the interactions; and
- update the arrangement of the display elements among the primary tier and the one or more secondary tiers based on the level of interest of the user, wherein updating comprises moving a display element from the primary tier to the one or more secondary tiers in response to not displaying the display element for a time above a threshold value.

17. The computer program product of claim 16, wherein the level of interest for a corresponding display element is determined from an amount of time the corresponding display element is displayed on the display and a frequency of interaction between the user and the corresponding display element.

18. The computer program product of claim 16, wherein the display elements are presented sequentially on a touch screen device, and wherein the program instructions further cause the computer to:
- process between different display elements of a tier in response to a horizontal swipe from the user; and
- process between different tiers in response to a vertical swipe from the user.

19. The computer program product of claim 16, wherein responsive to receiving a user swipe in a vertical direction, the program instructions further cause the computer to:
- determine whether a corresponding display element located in the one or more secondary tiers is of interest to the user; and
- add the corresponding display element to the primary tier when the corresponding display element of the one or more secondary tiers is determined to be of interest to the user.

20. The computer program product of claim 16, wherein the program instructions further cause the computer to:
- request data corresponding to related display elements, based on display elements of interest.

21. The computer program product of claim 16, wherein the program instructions further cause the computer to:
- send a request for data to populate the display elements without providing user-specific information in the request.

22. The computer program product of claim 16, wherein user-specific information is stored locally to the computer and is not transmitted to another computing device.

* * * * *

UNITED STATES PATENT AND TRADEMARK OFFICE
CERTIFICATE OF CORRECTION

| | | |
|---|---|---|
| PATENT NO. | : 11,099,719 B1 | Page 1 of 1 |
| APPLICATION NO. | : 16/800071 | |
| DATED | : August 24, 2021 | |
| INVENTOR(S) | : Rodney Thompson et al. | |

It is certified that error appears in the above-identified patent and that said Letters Patent is hereby corrected as shown below:

On the Title Page

Item [72], change "Ron Harris" to --Ronald Harris--.

Signed and Sealed this
Eleventh Day of February, 2025

Coke Morgan Stewart
*Acting Director of the United States Patent and Trademark Office*